US008145883B2

(12) United States Patent
Sartorius et al.

(10) Patent No.: US 8,145,883 B2
(45) Date of Patent: *Mar. 27, 2012

(54) PRELOADING INSTRUCTIONS FROM AN INSTRUCTION SET OTHER THAN A CURRENTLY EXECUTING INSTRUCTION SET

(75) Inventors: Thomas Andrew Sartorius, Raleigh, NC (US); Brian Michael Stempel, Raleigh, NC (US); Rodney Wayne Smith, Raleigh, NC (US)

(73) Assignee: QUALCOMM Incorporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/722,962

(22) Filed: Mar. 12, 2010

(65) Prior Publication Data

US 2010/0169615 A1 Jul. 1, 2010

Related U.S. Application Data

(63) Continuation of application No. 11/685,850, filed on Mar. 14, 2007, now Pat. No. 7,711,927.

(51) Int. Cl.
*G06F 9/30* (2006.01)
(52) U.S. Cl. .................. 712/213; 712/43; 712/207
(58) Field of Classification Search .................. None
See application file for complete search history.

(56) References Cited

U.S. PATENT DOCUMENTS

| 5,335,331 | A |   | 8/1994  | Murao et al. |
| 5,560,028 | A | * | 9/1996  | Sachs et al. ............ 712/23 |
| 5,638,525 | A |   | 6/1997  | Hammond et al. |
| 5,819,056 | A |   | 10/1998 | Favor |
| 5,822,559 | A |   | 10/1998 | Narayan et al. |
| 6,002,876 | A |   | 12/1999 | Davis et al. |
| 6,021,265 | A |   | 2/2000  | Nevill |
| 6,023,756 | A | * | 2/2000  | Okamura ............... 712/208 |
| 6,081,884 | A |   | 6/2000  | Miller |
| 6,085,314 | A | * | 7/2000  | Asghar et al. ............ 712/213 |
| 6,134,650 | A | * | 10/2000 | Zuraski et al. ............ 712/213 |
| 6,324,643 | B1 | * | 11/2001 | Krishnan et al. ............ 712/237 |
| 6,356,997 | B1 |   | 3/2002  | Krishnan et al. |
| 6,374,348 | B1 |   | 4/2002  | Irie et al. |
| 6,430,674 | B1 |   | 8/2002  | Trivedi et al. |

(Continued)

FOREIGN PATENT DOCUMENTS

EP 0411747 2/1991

(Continued)

OTHER PUBLICATIONS

Written Opinion—PCT/US08/057064, International Search Authority—European Patent Office—Jul. 9, 2008.

(Continued)

*Primary Examiner* — Idress N Alrobaye
(74) *Attorney, Agent, or Firm* — Peter M. Kamarchik; Nicholas J. Pauley; Jonathan T. Velasco

(57) ABSTRACT

A preload instruction in a first instruction set is executed at a processor. The preload instruction causes the processor to preload one or more instructions into an instruction cache. The pre-loaded instructions are pre-decoded according to a second instruction set that is different from the first instruction set. The preloaded instructions are pre-decoded according to the second instruction set in response to an instruction set preload indicator (ISPI).

27 Claims, 2 Drawing Sheets

U.S. PATENT DOCUMENTS

| | | | |
|---|---|---|---|
| 6,438,700 B1 | 8/2002 | Adusumilli | |
| 6,449,712 B1 * | 9/2002 | Irie et al. | 712/227 |
| 6,564,298 B2 | 5/2003 | Jourdan et al. | |
| 6,654,871 B1 | 11/2003 | Aidan et al. | |
| 6,654,873 B2 | 11/2003 | Kadowaki | |
| 6,816,962 B2 | 11/2004 | Augsburg et al. | |
| 6,907,515 B2 | 6/2005 | Seal et al. | |
| 6,910,206 B1 | 6/2005 | Nevill | |
| 6,952,754 B2 | 10/2005 | O'Connor et al. | |
| 6,965,984 B2 | 11/2005 | Seal et al. | |
| 6,978,358 B2 | 12/2005 | Francis | |
| 7,003,652 B2 | 2/2006 | Nevill et al. | |
| 7,017,030 B2 | 3/2006 | Oldfield et al. | |
| 7,080,242 B2 | 7/2006 | Morris | |
| 7,093,108 B2 | 8/2006 | Swaine | |
| 7,120,779 B2 | 10/2006 | Seal | |
| 7,134,003 B2 | 11/2006 | Watt | |
| 7,234,043 B2 | 6/2007 | Blasco Allue et al. | |
| 7,328,332 B2 * | 2/2008 | Tran | 712/238 |
| 7,353,363 B2 | 4/2008 | Chaudhry et al. | |
| 7,356,673 B2 | 4/2008 | Altman et al. | |
| 7,360,060 B2 | 4/2008 | Chauvel et al. | |
| 7,406,585 B2 | 7/2008 | Rose et al. | |
| 7,421,568 B2 | 9/2008 | Stempel et al. | |
| 7,493,479 B2 | 2/2009 | Kabasawa et al. | |
| 7,547,043 B2 | 6/2009 | Kokeguchi et al. | |
| 2002/0004897 A1 | 1/2002 | Kao et al. | |
| 2002/0083302 A1 | 6/2002 | Nevill et al. | |
| 2003/0182535 A1 * | 9/2003 | Kadowaki | 712/207 |
| 2004/0019747 A1 * | 1/2004 | Barlow et al. | 711/141 |
| 2004/0024990 A1 | 2/2004 | Chauvel et al. | |
| 2004/0024991 A1 * | 2/2004 | Chauvel et al. | 712/209 |
| 2004/0133764 A1 * | 7/2004 | O'Connor et al. | 712/43 |
| 2005/0177707 A1 * | 8/2005 | Banerjee et al. | 712/226 |
| 2005/0262329 A1 | 11/2005 | Krishnan et al. | |
| 2006/0149927 A1 | 7/2006 | Dagan et al. | |
| 2006/0200686 A1 * | 9/2006 | Stempel et al. | 713/300 |
| 2006/0265573 A1 | 11/2006 | Smith et al. | |
| 2007/0113055 A1 * | 5/2007 | Dale et al. | 712/228 |
| 2007/0260854 A1 | 11/2007 | Smith et al. | |
| 2007/0283358 A1 * | 12/2007 | Kasahara et al. | 718/104 |
| 2008/0229069 A1 | 9/2008 | Sartorius et al. | |
| 2009/0249033 A1 | 10/2009 | Greenhalgh et al. | |

FOREIGN PATENT DOCUMENTS

| | | |
|---|---|---|
| JP | 6208463 A | 7/1994 |
| WO | 2006125219 | 11/2006 |

OTHER PUBLICATIONS

International Search Report—PCT/US08/057064, International Search Authority—European Patent Office—Jul. 9, 2008.

* cited by examiner

PRELOADING INSTRUCTIONS FROM AN INSTRUCTION SET OTHER THAN A CURRENTLY EXECUTING INSTRUCTION SET

CROSS-REFERENCE TO RELATED APPLICATIONS

This application is a Continuation Patent Application of, and claims priority from, U.S. patent application Ser. No. 11/685,850, filed on Mar. 14, 2007, issued May 4, 2010 as U.S. Pat. No. 7,711,927, and entitled "SYSTEM, METHOD AND SOFTWARE TO PRELOAD INSTRUCTIONS FROM AN INSTRUCTION SET OTHER THAN ONE CURRENTLY EXECUTING", which is hereby incorporated by reference in its entirety.

FIELD

The present invention relates generally to the field of processors and, in particular, to pre-loading and pre-decoding instructions according to an instruction set other than a currently executing instruction set.

BACKGROUND

Microprocessors perform computational tasks in a wide variety of applications. Improved processor performance is almost always desirable, to allow for faster operation and/or increased functionality through software enhancements. By exploiting both architectural advances, such as RISC architectures, and advances in semiconductor technology, many modern processors execute at clock speeds much higher than memory chips, such as DRAM and SDRAM. To minimize the penalty of relatively slow memory accesses, these processors utilize a hierarchical memory structure, with fast, on-chip cache memories storing local copies of data and instructions that have been recently accessed and/or that the processor anticipates (via software) accessing in the near future.

One example of anticipating loads to an instruction cache is a preload instruction (e.g., the ARM instruction PLI). A preload instruction loads instructions into the instruction cache in advance of their execution. A programmer may insert a preload instruction into code somewhat ahead of a known or anticipated branch, such as a subroutine call, to a target. The preload instruction loads instructions at the target into the instruction cache, so that when the branch executes, instructions at the target are available in the cache for immediate execution. Instructions to be loaded into a cache in response to a preload instruction are referred to herein as pre-loaded instructions.

Most modern processors employ a pipelined architecture, where sequential instructions are overlapped in execution to increase overall processor throughput. Maintaining smooth execution through the pipeline is critical to achieving high performance. One pipeline optimization technique known in the art is pre-decoding instructions. Instructions are examined as they are read from memory, are partially decoded, and some information about the instructions—known as pre-decode information—is stored in an instruction cache along with the associated instructions. When the instructions are later fetched into the pipeline from the cache, the pre-decode information is also fetched, and is used to assist in fully decoding the instructions. Pre-decode information may, for example, identify branch and floating-point instructions, identify the length of an instruction in a variable-length instruction set architecture, or other information useful in executing the instructions in the pipeline.

Some modern processors are able to execute instructions according to two or more instruction set encodings. For example, a processor may have a 32-bit native instruction set, and additionally include the ability to execute Java byte codes. As another example, several versions of the ARM processor architecture execute 32-bit ARM instruction encodings in an ARM instruction set operating mode, and 16-bit or 32-bit Thumb instruction encodings in a Thumb instruction set operating mode. Programmers explicitly set the proper instruction set operating mode in software, prior to executing instructions according to the relevant instruction set encoding.

When a conventional processor having a pre-decoder executes a preload instruction, the pre-loaded instructions are pre-decoded according to the current instruction set operating mode. If a programmer wishes to preload instructions in an instruction set different from the current processor instruction set operating mode—for example in anticipation of a branch to code section written in a different instruction set—the programmer must change the instruction set mode prior to executing the preload instruction.

For example, a program executing ARM instructions in ARM mode may change to Thumb mode and branch to a code segment executing only Thumb instructions. To preload the Thumb instructions with correct pre-decoding, the program must switch the current processor instruction set operating mode from ARM to Thumb, execute a preload instruction with the target address of the Thumb code, then switch back to ARM mode to execute the remaining ARM instructions, prior to the branch into the Thumb code section.

Failure to enter Thumb mode to execute the preload instruction would cause the pre-decoder to incorrectly pre-decode the pre-loaded Thumb instructions according to ARM instruction set encodings. If this occurred, when fetched from the instruction cache the pre-decode information would be useless and the Thumb instructions would have to be re-fetched, incurring a delay that the preload was meant to obviate. In addition, in an instruction cache having an ARM/Thumb bit as part of the tag, the re-fetched Thumb instructions would be allocated a separate cache line, and the Thumb instructions incorrectly pre-decoded as ARM instructions would remain in the cache, wasting cache space and hence lowering the cache hit rate and system performance.

In many processors, the overhead involved in switching the current processor instruction set operating mode twice to execute a single preload instruction may outweigh the benefit of pre-loading instructions in the anticipated instruction set.

SUMMARY

According to one or more embodiments disclosed herein, a preload instruction in a first instruction set is executed at a processor. The preload instruction causes the processor to preload one or more instructions into an instruction cache. The pre-loaded instructions are pre-decoded according to a second instruction set that is different from the first instruction set. The preloaded instructions are pre-decoded according to the second instruction set in response to an instruction set preload indicator (ISPI).

One embodiment relates to a method of preloading instructions. The method includes, at an instruction execution unit of a processor executing in a first instruction set operating mode associated with a first instruction set of a plurality of instruction sets, generating an instruction set preload indicator identifying a second instruction set of the plurality of instruction sets. The second instruction set is a subset of the first instruction set. The method also includes executing, in accordance with the first instruction set operating mode, a preload instruction operative to preload an instruction into an instruction cache. The method further includes pre-decoding the pre-loaded instruction in the instruction cache according to a second instruction set operating mode associated with the identified second instruction set.

Another embodiment relates to a processor. The processor includes a memory interface and an instruction cache operative to store instructions and pre-decode information. The processor also includes an instruction execution unit operative to retrieve the instructions when the processor is in a first instruction set operating mode and to generate an instruction set preload indicator. The processor further includes a pre-decoder interposed between the instruction cache and the memory interface. The pre-decoder is operative to pre-decode pre-loaded instructions according to a second instruction set operating mode in response to the instruction set preload indicator. The first instruction set operating mode is associated with a first instruction set of the processor and the second instruction set operating mode is associated with a second instruction set of the processor. The first instruction set has a first code density that is different than a second code density of the second instruction set.

Another embodiment relates to a computer-readable medium. The computer-readable medium stores a preload instruction in a first instruction set. The preload instruction is executable by a processor to cause the processor to preload instructions into an instruction cache. The pre-loaded instructions are pre-decoded according to a second instruction set that is a reduced-size version of the first instruction set.

DETAILED DESCRIPTION

Figure 1:
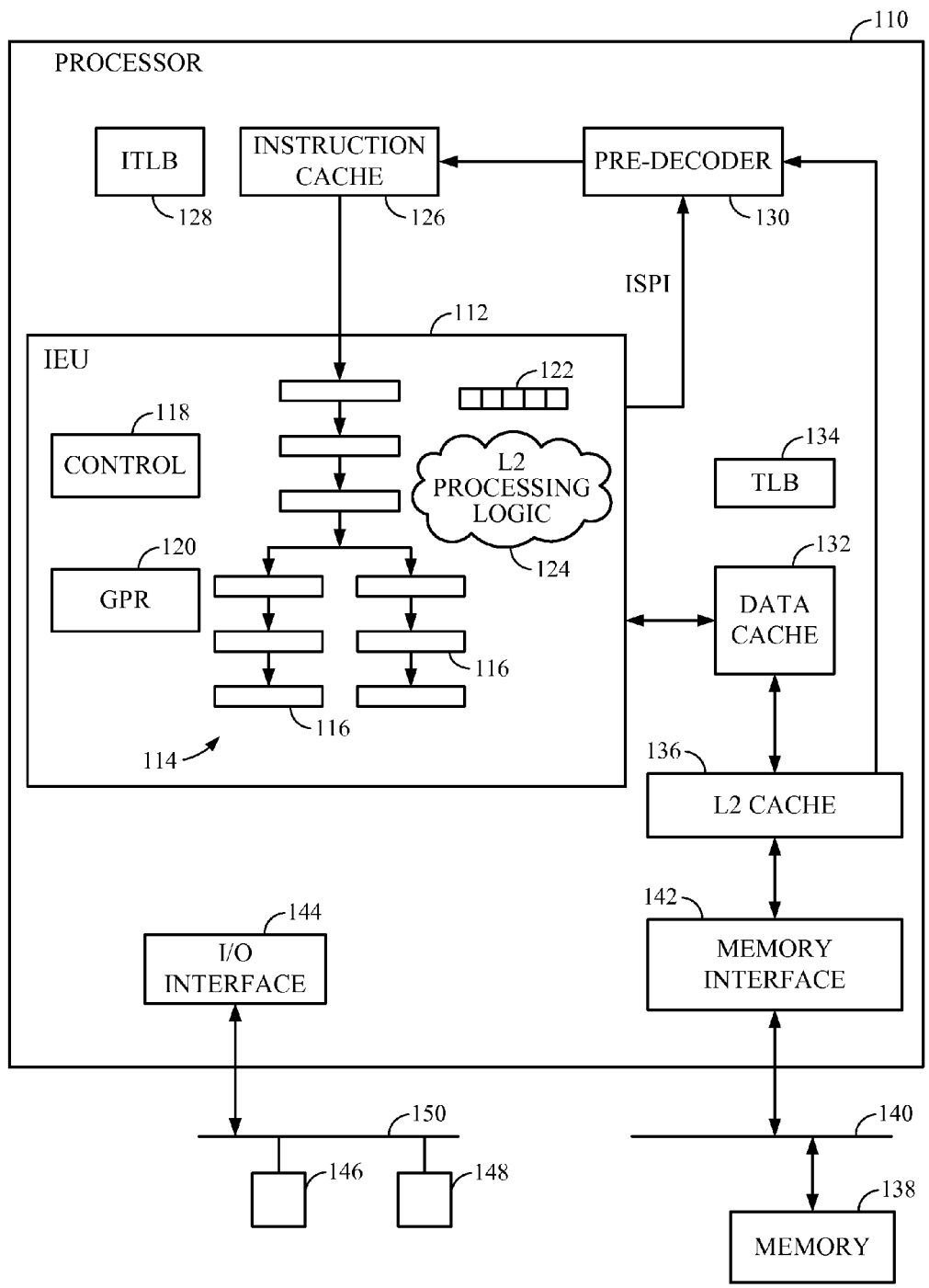
FIG. 1 is a block diagram of a particular embodiment of a processor capable of pre-decoding pre-loaded instructions according an instruction set other than a current processor instruction set mode.

FIG. 1 depicts a block diagram of a processor 110 that executes instructions encoded according to a plurality of different instruction set encodings. The processor 110 is capable of pre-decoding pre-loaded instructions according to an instruction set other than the current processor instruction set mode.

The processor 110 executes instructions in an instruction execution unit 112 that includes a pipeline 114 comprising a plurality of registers or latches 116, organized in pipe stages, as well as logical and computational circuits such as Arithmetic Logic Units (ALU) (not shown). The pipeline executes instructions according to control logic 118. The pipeline 114 may be a superscalar design, as shown. A General Purpose Register (GPR) file 120 provides registers comprising the top of a memory hierarchy. The instruction execution unit also includes a status register 122 that indicates, for example, the current processor instruction set operating mode, which defines one of a plurality of instruction set encodings under which instructions are decoded and executed. The instruction execution unit 112 also includes L2 processing logic 124 that tracks properties of instructions and data fetched from an L2 cache memory 136 or main memory 138.

The pipeline 114 fetches instructions from an instruction cache 126, with memory addressing and permissions managed by an Instruction-side Translation Lookaside Buffer (ITLB) 128. A pre-decoder 130 pre-decodes instructions fetched from the L2 cache 136 (or main memory 138) and places the instructions and pre-decode information into the instruction cache 126. As discussed in greater detail herein, the pre-decoder 130 pre-decodes pre-loaded instructions according to an instruction set different than the current processor instruction set operating mode, in response to an instruction set preload indicator (ISPI) from the instruction execution unit 112.

Data is accessed from a data cache 132, with memory addressing and permissions managed by a main Translation Lookaside Buffer (TLB) 134. In various embodiments, the ITLB 128 may comprise a copy of part of the TLB 134. Alternatively, the ITLB 128 and TLB 134 may be integrated. Similarly, in various embodiments of the processor 110, the instruction cache 126 and data cache 132 may be unified.

Misses in the instruction cache 126 and data cache 132 cause an access to Level-2 (L2) cache memory 136 which, in the embodiment depicted in FIG. 1, is integrated. Misses in the L2 cache 136 cause an access to main (off-chip) memory 138 over a system bus 140, under the control of a memory interface 142. The processor 110 may include an Input/Output (I/O) interface 144, controlling access to various peripheral devices 146, 148 across a peripheral bus 150. As well known in the art, the processor 110 executes instructions retrieved from a computer readable medium, such as memory 136, or magnetic or optical media read by a peripheral 146, 148.

Those of skill in the art will recognize that numerous variations of the processor 110 are possible. For example, the processor 110 may include a Level-3 (L3) or additional cache, and/or a separate L2 cache 136 may be dedicated to each of the instruction and data caches 126, 132. In addition, one or more of the functional blocks depicted in the processor 110 may be omitted from a particular embodiment.

The processor 110 executes instructions according to the current processor instruction set mode, as indicated for example in the status register 122. To allow the pre-loading—with correct pre-decoding—of instructions in a different instruction set, the instruction execution unit 112 generates an instruction set preload indicator (ISPI), and provides the ISPI to the pre-decoder 130 upon executing a preload instruction. If the processor 110 supports two instruction set encodings (e.g., ARM and Thumb), the ISPI may comprise a single bit. If the processor 110 supports more than two instruction set encodings, the ISPI may comprise a multi-bit value, and may comprise a separate flag for each instruction set, or may encode an instruction set indication in a binary value, as well known in the art. The ISPI may be generated in a variety of ways.

In one embodiment, one or more unused address bits of the preload instruction target address are encoded as the ISPI. A preload instruction (e.g., PLI) takes a target address as an operand. The instruction address may be decomposed into, for example, a tag, a set number, and a cache line offset. For example, for a 32-bit instruction virtual address VA[31:0], the tag, which is compared against tags stored in a CAM structure of the instruction cache 126, may comprise VA[31:11]. In an n-way set associative cache, the set number selects from among n results returned if the tag matches. The set number may comprise VA[10:5]. The offset, VA[4:0], addresses individual instructions in the cache line, that are stored in a RAM structure of the instruction cache 126 (along with pre-decode information).

A preload instruction loads a fixed-sized block of memory into each cache line. If all of the instructions are of the same length, a fixed number of instructions are loaded into the cache line. In a variable-length instruction set, or if the cache line includes instructions encoded according to different instructions sets having different length instructions, the number of instructions in the cache line is not known upon loading the instructions into the instruction cache. In either event, however, the amount of data to be loaded into the instruction cache line is known, and accordingly the preload instruction does not utilize the cache line offset portion of the address.

According to one embodiment, the cache line offset, e.g., VA[4:0], is used to encode the instruction set preload indicator (ISPI). In particular, in an embodiment where the processor 110 executes instructions from two instruction sets, the ISPI is the least significant bit VA[0]. As one non-limiting example, VA[0]=0 may indicate ARM instructions, and VA[0]=1 may indicate Thumb instructions. Of course, other ISPI encodings are possible, and depend on the number and type of instruction sets the processor 110 supports.

The ISPI is encoded into the cache line offset portion of a preload target address when the address is determined and written to a compiler-specified GPR in preparation for execution of an associated preload instruction. When the preload instruction executes, it reads a target address from the specified GPR register, and preloads a block of data at the target address into a cache line determined by the tag and set number portions of the address. If the address hits in the instruction cache, the preload instruction execution is complete. If the address misses in the instruction cache, logic within the instruction execution unit 112, such as L2 processing logic 124, performs miss processing, accessing the L2 cache 136 and, if necessary, main memory 138 to retrieve the instructions.

When a block of data containing instructions is loaded into the pre-decoder 130, the L2 processing logic 124 presents the ISPI to the pre-decoder 130. In response to the ISPI, the pre-decoder 130 pre-decodes instructions according to the indicated instruction set, regardless of the current instruction set operating mode of the processor 110. The pre-decoder 130 then writes the instructions, along with the correct pre-decode information, to the instruction cache 126. In one embodiment, the pre-decoder 130 receives an indication of a preload instruction execution and examines the ISPI in response to such indication (ignoring the ISPI for normal instruction cache line fetches). In another embodiment, logic in the instruction execution unit 112, such as the L2 processing logic 124, may combine the ISPI with knowledge of a preload instruction execution, and present to the pre-decoder 130 an indication of the instruction set by which currently fetched instructions should be pre-decoded. In either case, the pre-decoder 130 pre-decodes pre-loaded instructions according to a particular instruction set in response to the ISPI.

In one embodiment, the above-described pre-decoding of pre-loaded instructions according to the ISPI is selectively enabled, to provide backward compatibility. In particular, an interworking mode is defined. The interworking mode may be indicated by a bit in the status register 122. When the interworking mode is enabled, the pre-decoding of pre-loaded instructions depends on the ISPI, as described above. When the interworking mode is disabled, instructions are pre-decoded according to the processor instruction set mode that is active when the preload instruction is executed.

In one embodiment, the instruction set preload indicator (ISPI) comprises one or more bits in a register, such as the status register 122. In this embodiment, the ISPI bits are explicitly set prior to execution of a preload instruction. Upon execution of the preload instruction, the pre-decoder 130 inspects the ISPI bits in the status register 122 or other register, and pre-decodes the pre-loaded instructions according to the instruction set encoding indicated by the ISPI bits (regardless of the processor instruction set mode that is active at the time). The instructions and pre-decode information are then written to the instruction cache 126. In one embodiment, the pre-decoding of pre-loaded instructions according to the ISPI is selectively enabled by an interworking mode, as described above. In one embodiment, the ISPI bits may be gated by the interworking mode indicator bit.

In one embodiment, the instruction set preload indicator (ISPI) comprises one or more bits in the op code of the preload instruction. A bit field of the preload instruction op code may be defined for the ISPI, and a compiler may set the ISPI bit field according to a programmer's instructions or directives in code. Upon execution of the preload instruction, the ISPI bit field is presented to the pre-decoder 130, such as by the L2 processing logic 124, and the pre-decoder 130 pre-decodes the pre-loaded instructions according to the indicated instruction set encoding. The instructions and pre-decode information are then written to the instruction cache 126.

In one embodiment, two or more separate preload instructions are defined for preloading instructions in different instructions sets. As a non-limiting example, an ARM instruction set may include a conventional preload instruction that preloads data into the instruction cache 126, with the pre-decoder 130 pre-decoding the pre-loaded instructions as ARM instructions. In addition, the ARM instruction set may also include a separate, alternate instruction set preload instruction (e.g., PLI2) that preloads data into the instruction cache 126, with the pre-decoder 130 pre-decoding the pre-loaded instructions as Thumb instructions. Similarly, the Thumb instruction set may include separate preload instructions for pre-loading data that is pre-decoded according to Thumb or ARM instruction set encodings. This allows programmers to explicitly preload instructions from the desired instruction set by utilizing the appropriate preload instructions in code.

Those of skill in the art will recognize that the above-described embodiments are not mutually exclusive. For example, a preload instruction having an ISPI bit field in the op code or a unique preload instruction may, in particular implementations, present the ISPI to the pre-decoder 130 by latching the ISPI into a register such as the status register 122, or by substituting the ISPI into one or more unused address bits in the preload target address. In general, given the teachings of the present disclosure, those of skill in the art may ascertain the best solution for preloading instructions in different instruction sets for a given application.

Figure 2:
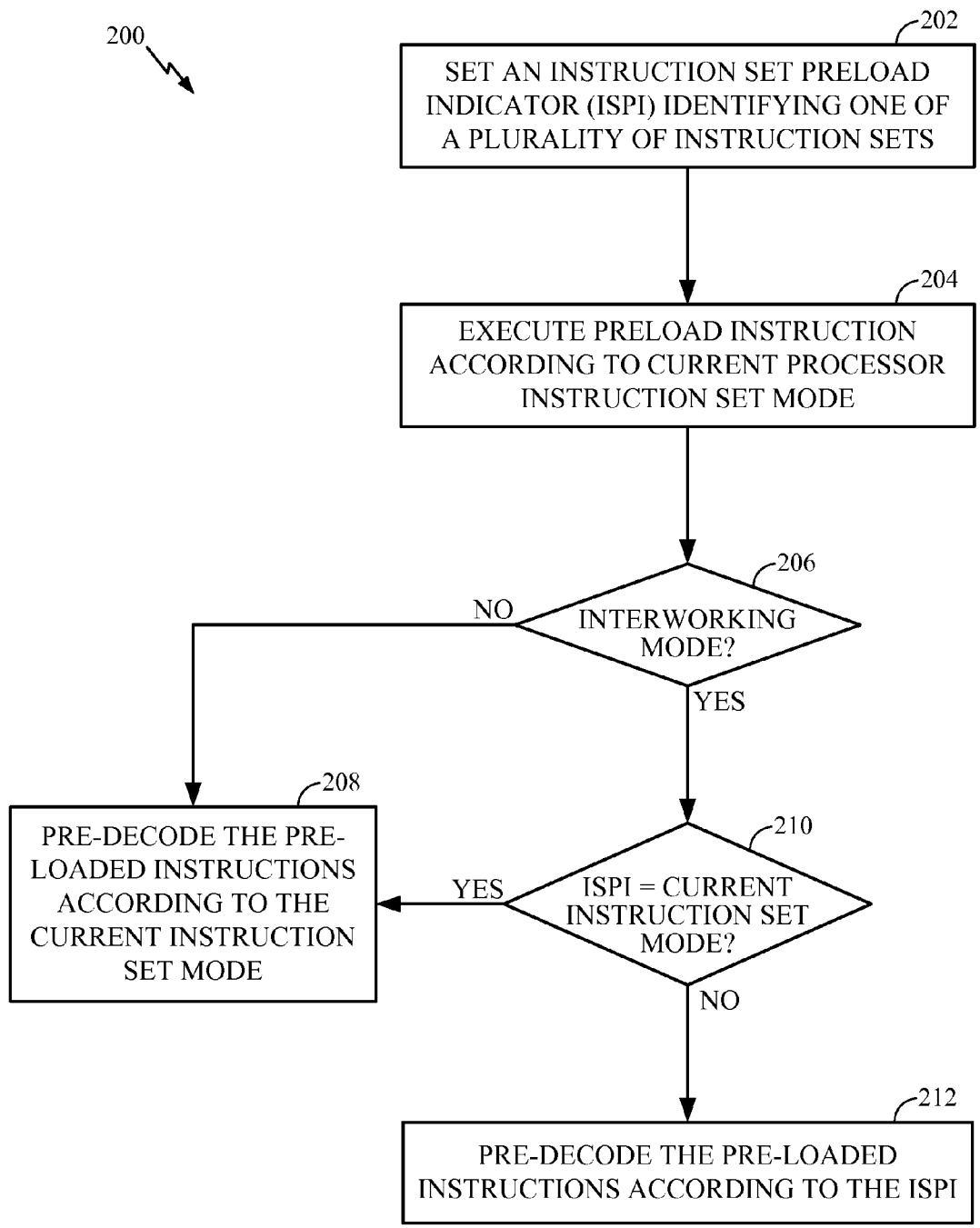
FIG. 2 is a flow diagram of a particular embodiment of a method of pre-loading instructions in one of a plurality of instruction sets.

FIG. 2 depicts a method 200 of preloading instructions. The method begins by setting an instruction set preload indicator (ISPI) (block 202). The ISPI uniquely identifies one of a plurality of instruction sets supported by the processor 110. In various embodiments, the ISPI may be set by altering a preload instruction target address, setting ISPI bits in a register such as the status register 122, setting an ISPI bit field in a preload instruction op code, or selecting a unique preload instruction.

A preload instruction is executed in the current processor instruction set mode (block 204). The preload instruction is operative to load instructions into the instruction cache 126 in advance of the pre-loaded instructions' execution. In one embodiment, pre-decoding of the pre-loaded instructions depends on the interworking mode. If the interworking mode is not enabled (block 206), the pre-decoder 130 pre-decodes the pre-loaded instructions according to the current instruction set mode (block 208). If the interworking mode is enabled (block 206), and the ISPI indicates or identifies an instruction set other than the current instruction set mode (block 210), the pre-decoder 130 pre-decodes the pre-loaded instructions according to the instruction set indicated by the ISPI (block 212).

According to one or more embodiments described and claimed herein, programmers may preload instructions into an instruction cache 126 while executing instructions from a first instruction set, with the pre-loaded instructions pre-decoded according to a second, different instruction set. In this manner, the execution of code that switches between instruction sets may be optimized by ensuring that instructions in a given instruction set are available in an instruction cache 126 prior to branching to code written in that instruction set. The communication to a pre-decoder 130 of an instruction set preload indicator (ISPI) may be implemented in a variety of ways.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of preloading instructions, the method comprising:
   at an instruction execution unit of a processor executing in a first instruction set operating mode associated with a first instruction set of a plurality of instruction sets, generating an instruction set preload indicator identifying a second instruction set of the plurality of instruction sets, wherein the first instruction set includes at least one instruction that is not included in the second instruction set;
   executing, in accordance with the first instruction set operating mode, a preload instruction in the first instruction set operative to preload an instruction into an instruction cache, the preload instruction causing pre-loaded instructions to be pre-decoded according to the second instruction set; and
   while executing in accordance with the first instruction set operating mode, pre-decoding the pre-loaded instruction in the instruction cache according to a second instruction set operating mode associated with the identified second instruction set.

2. The method of claim 1, wherein the pre-loaded instruction is a single instruction that is pre-decoded at a pre-decoder of the processor, the method further comprising receiving the generated instruction set preload indicator at the pre-decoder of the processor.

3. The method of claim 1, wherein the instruction set preload indicator comprises one or more bits of an address of a cache line into which instructions are preloaded.

4. The method of claim 3, wherein the instruction set preload indicator comprises a least significant bit of the address of the cache line.

5. The method of claim 1, wherein the instruction set preload indicator comprises one or more bits in an op code of the preload instruction.

6. The method of claim 1, wherein the preload instruction is a unique instruction in the first instruction set that causes pre-loaded instructions to always be pre-decoded according to the second instruction set, and wherein generating the instruction set preload indicator comprises selecting the unique preload instruction.

7. The method of claim 1, wherein generating the instruction set preload indicator comprises setting one or more bits in a register prior to executing the preload instruction.

8. The method of claim 1 wherein the pre-loaded instruction is pre-decoded in according to the second instruction set operating mode in an interworking mode.

9. The method of claim 1, wherein the first instruction set is an ARM-type instruction set and the second instruction set is a Thumb-type instruction set, or wherein the first instruction set is a Thumb-type instruction set and the second instruction set is an ARM-type instruction set.

10. The method of claim 1, wherein the first instruction set is associated with a first instruction length and wherein the second instruction set is associated with a second instruction length that is different than the first instruction length.

11. The method of claim 1, wherein the first instruction length is a 32-bit length and wherein the second instruction length is a 16-bit length.

12. The method of claim 1, wherein each instruction in the first instruction set has a first instruction length, and wherein the second instruction set includes a first instruction having the first instruction length and a second instruction having a second instruction length that is different than the first instruction length.

13. The method of claim 1, wherein the first instruction set comprises fixed-size instructions and wherein the second instruction-set comprises variable-sized instructions.

14. A processor, comprising:
   a memory interface;
   an instruction cache operative to store instructions and pre-decode information;
   an instruction execution unit operative to retrieve the instructions when the processor is in a first instruction set operating mode and to generate an instruction set preload indicator; and
   a pre-decoder, interposed between the instruction cache and the memory interface, operative to pre-decode pre-loaded instructions in the instruction cache according to a second instruction set operating mode in response to the instruction set preload indicator, while the instruction execution unit operates in the first instruction set operating mode, the pre-loaded instructions of the second instruction set preloaded in response to a preload instruction in the first instruction set,
   wherein the first instruction set operating mode is associated with the first instruction set of the processor, wherein the second instruction set operating mode is associated with a second instruction set of the processor, and wherein the first instruction set has a first code density that is different than a second code density of the second instruction set.

15. The processor of claim 14, wherein the instruction execution unit generates the instruction set preload indicator by setting one or more bits of an address of a cache line of the instruction cache into which instructions are preloaded.

16. The processor of claim 15, wherein the address of the cache line is written to a general purpose register.

17. The processor of claim 14, further comprising a register, wherein the instruction execution unit generates the instruction set preload indicator by setting one or more bits in the register.

18. The processor of claim 14, further comprising a second cache memory interposed between the instruction cache and the memory interface, wherein the pre-decoder is interposed between the instruction cache and the second cache memory.

19. The processor of claim 14, wherein the pre-decoder is operative to pre-decode instructions according to the second instruction set operating mode in an interworking mode.

20. A non-transitory computer-readable medium storing one or more instructions in a first instruction set of a plurality of instruction sets, wherein the one or more instructions are executable by a processor to cause the processor to:
  generate an instruction set preload indicator identifying a second instruction set of the plurality of instruction sets, wherein the first instruction set includes at least one instruction that is not included in the second instruction set;
  execute, in accordance with a first instruction set operating mode, the preload instruction in the first instruction set operative to preload an instruction into an instruction cache, the preload instruction causing pre-loaded instructions to be pre-decoded according to the second instruction set; and
  while executing in accordance with the first instruction set operating mode, pre-decode the pre-loaded instruction in the instruction cache according to a second instruction set operating mode associated with the identified second instruction set.

21. The non-transitory computer-readable medium of claim 20, wherein each of the pre-loaded instructions is pre-decoded according to the second instruction set.

22. The non-transitory computer-readable medium of claim 20, wherein the instruction set preload indicator is stored in a status register prior to execution of the preload instruction.

23. The non-transitory computer-readable medium of claim 20, wherein the first instruction set is an ARM instruction set and wherein the second instruction set is a Thumb instruction set, or wherein the first instruction set is a Thumb instruction set and wherein the second instruction set is an ARM instruction set.

24. A processor, comprising:
  a memory interface;
  a means for storing instructions and pre-decoding information in an instruction cache;
  a instruction execution means for retrieving the instructions when a processor is in a first instruction set operating mode and for generating an instruction set preload indicator; and
  a means for pre-decoding, interposed between the means for storing instructions and the memory interface, for pre-loading instructions according to a second instruction set operating mode into the means for storing instructions in response to the instruction set preload indicator, while the instruction execution means operates in the first instruction set operating mode, the pre-loaded instructions according to the second instruction set operating mode preloaded in response to a preload instruction in a first instruction set;
  wherein the first instruction set operating mode is associated with the first instruction set of the processor, wherein the second instruction set operating mode is associated with a second instruction set of the processor, and wherein the first instruction set has a first code density that is different than a second code density of the second instruction set.

25. The processor of claim 24, wherein the instruction execution means comprises means for generating the instruction set preload indicator by setting one or more bits of an address of a cache line of the instruction cache into which instructions are preloaded.

26. The processor of claim 25, wherein the address of the cache line is written to a general purpose register.

27. The processor of claim 24, wherein the means for pre-decoding comprises a means for pre-decoding instructions according to the second instruction set operating mode in an interworking mode.

* * * * *